(12) United States Patent
Permesang

(10) Patent No.: US 10,041,260 B2
(45) Date of Patent: Aug. 7, 2018

(54) CONSTRUCTION KIT FOR PRODUCING COVERINGS

(71) Applicant: ArsRatio Holding GmbH, Innsbruck (AT)

(72) Inventor: Claus Permesang, München (DE)

(73) Assignee: ArsRatio Holding GmbH, Innsbruck (AT)

(*) Notice: Subject to any disclaimer, the term of this patent is extended or adjusted under 35 U.S.C. 154(b) by 56 days.

(21) Appl. No.: 14/414,234

(22) PCT Filed: Jun. 12, 2013

(86) PCT No.: PCT/DE2013/100212
§ 371 (c)(1),
(2) Date: Apr. 27, 2015

(87) PCT Pub. No.: WO2014/008888
PCT Pub. Date: Jan. 16, 2014

(65) Prior Publication Data
US 2015/0349506 A1    Dec. 3, 2015

(30) Foreign Application Priority Data
Jul. 10, 2012    (DE) .................. 10 2012 106 182

(51) Int. Cl.
| E04B 5/00 | (2006.01) |
| E04F 19/08 | (2006.01) |
| H02G 3/08 | (2006.01) |
| H02G 3/38 | (2006.01) |
| H02G 3/18 | (2006.01) |

(52) U.S. Cl.
CPC ............. *E04F 19/08* (2013.01); *H02G 3/088* (2013.01); *H02G 3/185* (2013.01); *H02G 3/283* (2013.01); *H02G 3/285* (2013.01); *E04F 2290/026* (2013.01)

(58) Field of Classification Search
CPC .... E04F 19/08; E04F 2290/026; H02G 3/088; H02G 3/283; H02G 3/185; H02G 3/285
USPC ...................... 52/408, 220, 220.1, 220.3, 221
See application file for complete search history.

(56) References Cited

U.S. PATENT DOCUMENTS 2,950,575 A * 8/1960 Hellwig ................. E04C 1/397
                                                                174/491
3,549,781 A * 12/1970 Jones ................ E04F 15/02411
                                                                174/486
4,773,196 A * 9/1988 Yoshida ................. H02G 3/285
                                                                174/486

(Continued)

FOREIGN PATENT DOCUMENTS

| CN | 101877453 A | 11/2010 |
| DE | 3702629 A1 | 8/1988 |

(Continued)

*Primary Examiner* — Basil S Katcheves
(74) *Attorney, Agent, or Firm* — Lucas & Mercanti, LLP; Klaus P. Stoffel

(57) ABSTRACT

A construction kit for producing coverings, particularly floor coverings, including components laid with their edges adjoining one another. According to the invention, the construction kit has components with at least one channel, particularly a groove open toward the support surface of the component, for receiving electric cables, and comprises a passage, connected to the channel and open toward the visible surface of the component, for laying the cables.

20 Claims, 2 Drawing Sheets

(56) References Cited

U.S. PATENT DOCUMENTS

| | | | |
|---|---|---|---|
| 4,852,315 A * | 8/1989 | Fukayama | E04F 15/02411 52/220.3 |
| 4,984,408 A * | 1/1991 | Habraken | E04B 2/82 52/105 |
| 4,996,810 A * | 3/1991 | Forde | E04F 15/02405 52/220.3 |
| 5,057,647 A * | 10/1991 | Bogden | H02G 3/285 174/482 |
| 5,263,289 A * | 11/1993 | Boyd | E04F 15/024 52/220.2 |
| 5,400,554 A | 3/1995 | Lo | |
| 5,434,355 A * | 7/1995 | Sho | H02G 3/28 174/487 |
| 5,489,458 A * | 2/1996 | Sato | H02G 3/283 428/137 |
| 5,560,171 A * | 10/1996 | McCoy | E02D 27/02 52/297 |
| 5,828,001 A * | 10/1998 | Schilham | H02G 3/285 174/485 |
| 5,904,015 A * | 5/1999 | Chen | E04F 15/02494 52/220.2 |
| 6,076,315 A * | 6/2000 | Kondo | H02G 3/285 52/220.1 |
| 6,164,026 A * | 12/2000 | Ehrenkrantz | B28B 7/0029 52/220.2 |
| 6,202,374 B1 * | 3/2001 | Cooper | E04B 5/48 52/126.3 |
| 6,311,440 B1 * | 11/2001 | Feldpausch | H02G 3/0493 312/223.2 |
| 6,353,180 B1 * | 3/2002 | DeBartolo, Jr. | H02G 3/0493 174/483 |
| 6,551,130 B2 * | 4/2003 | Bonilla | H01R 13/74 174/483 |
| 7,118,410 B2 * | 10/2006 | Hatori | H01R 13/5833 439/501 |
| 8,607,532 B2 | 12/2013 | Permesang | |
| 2001/0034987 A1 | 11/2001 | Cooper et al. | |

FOREIGN PATENT DOCUMENTS

| | | |
|---|---|---|
| DE | 9207318 U1 | 7/1992 |
| DE | 202005014362 U1 | 11/2005 |
| EP | 0428065 A | 5/1991 |
| FR | 2645566 A1 | 10/1990 |
| WO | 2005040521 A2 | 5/2005 |
| WO | 2010100331 A1 | 9/2010 |

* cited by examiner

CONSTRUCTION KIT FOR PRODUCING COVERINGS

The present application is a 371 of International application PCT/DE2013/100212, filed Jun. 12, 2013, which claims priority of DE 10 2012 106 182.3, filed Jul. 10, 2012, the priority of these applications is hereby claimed and these applications are incorporated herein by reference.

BACKGROUND OF THE INVENTION

The invention pertains to a construction kit for producing coverings, especially floor coverings, consisting of components laid with their edges adjoining one another.

The components cited above are, in the simplest case, plates such as stone plates or tiles. The components laid with their edges adjoining one another can also comprise devices for joining these edges together; for example, the edges can interlock as described in WO 2005/040521 A2.

Especially coverings consisting of components of the latter type can be rapidly laid down and picked up again if necessary and are therefore especially adapted to being laid temporarily in, for example, exhibition rooms or other types of event rooms.

SUMMARY OF THE INVENTION

Through the present invention, a novel construction kit of the type described above for producing coverings, especially floor coverings, is created, which is characterized in that it comprises components with at least one channel to accommodate electrical lines and a passage, open to the visible side of the component, for forming an electrical junction.

A construction kit of this type advantageously reduces the amount of effort required to provide the electrical installations which are necessary in many cases, especially when temporary holes must be made in the floor and/or wall coverings. The necessary cables are laid inside the covering, in the channel mentioned above, and contacted externally through the passage.

In an advantageous embodiment of the invention, the construction kit comprises components which comprise only the at least one passage. It is effective for such components to be used to form a long cable channel extending over a plurality of components, which channel then leads to the channel of a component comprising a passage, through which the electrical lines can be led to the outside.

In an especially preferred embodiment of the invention, the construction kit comprises components with two channels, which preferably cross each other at right angles. By lining up such components in rows, it is possible to form angled cable channels.

In another preferred embodiment, the at least one channel is a groove open to the support side of the component, which groove preferably extends along the edge of the component. The advantage of this is that it is easy to lay the lines in such a groove. Because the groove runs along the edge, the component can be stabilized by reinforcement adjacent to the floor, which, if the groove were to be located farther inward, would be interrupted by the groove and thus lose its effectiveness. Alternatively, the channel can be formed by a tube possibly cast or foamed in place in the component.

In cases where there is no need for an electrical junction, the opening of the passage on the visible side of the component can be closable, preferably in a liquid-tight manner, by a cover element. It is advisable for it to be possible to ride and walk on this cover element after it been installed.

The passage is preferably formed by a recess open at least to the visible side of the component, into which recess the channel opens laterally.

A junction element, especially a power outlet which can be connected to the electrical lines laid in the channel, can be mounted in the opening of the passage, wherein the passage advisably forms a junction space accommodating at least one connecting element, especially a blade terminal, which can be used to connect the electrical lines to the junction element.

The junction element can be connectable to the connecting element by flexible lines.

This latter type of connection in particular offers the advantage of mounting the junction element in the opening by means of a locking device, especially a bayonet joint, which can be locked by rotating the junction element. The advantage here is that, after removal of the above-mentioned cover, a junction element such as this can be easily mounted in the opening of the passage with little effort and thus, for example, a power outlet supplying line current can be easily installed. It is highly advantageous that the covering can therefore be thinner than the thickness required to accommodate a power outlet. That the junction element which comprises a power outlet and which can be installed if needed with little effort projects upward beyond the floor covering does not represent any disadvantage at all.

In a further elaboration of the invention, the junction element can comprise a passage in which low-voltage current lines can be laid, this passage communicating with the passage in the component. This pertains in particular to electrical lines which can be connected to a computer or to telecommunications devices.

The junction element can be configured as a junction box with at least one edge recess at the upper edge, through which the lines can be guided to the outside. Because of height, the preferably liquid-tight box mountable in the previously mentioned opening offers advantageous protection against the sprayed or flowing water which may be present during floor cleaning operations.

In a further elaboration of the invention, selected components in a covering formed by components without channels or passages can be replaced by components with channels and possibly with passages without the need to remove the components adjacent to them. The advantage here is that in this way, with little effort, a floor covering without any installations can be refitted with an electrical installation.

The invention is explained below in greater detail on the basis of exemplary embodiments and the attached drawings, which refer to these examples.

DETAILED DESCRIPTION OF THE INVENTION

Figure 1:
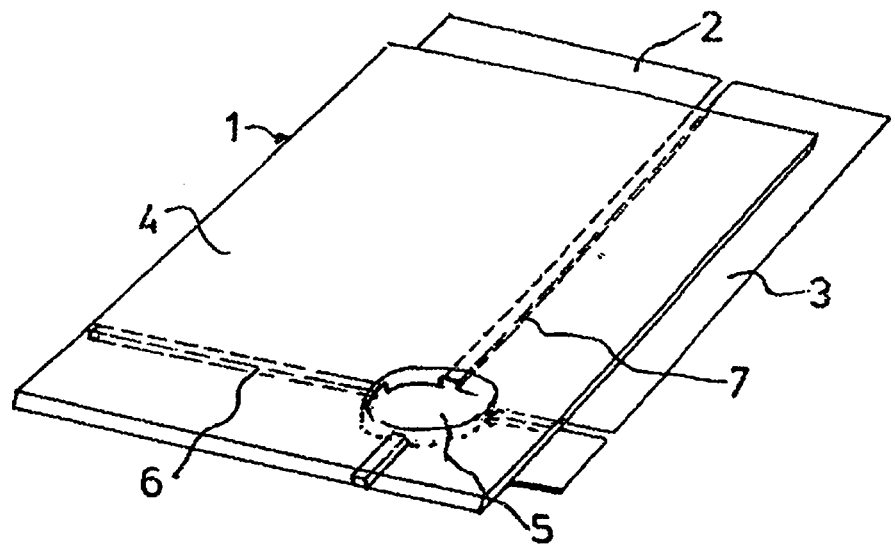
FIG. 1 shows a component of a construction kit according to the invention for producing floor and/or wall coverings.

A component for producing a floor and/or wall covering comprises a rectangular plate 1, from two sides of which, i.e., sides which are perpendicular to each other, connecting tabs 2 and 3 project. By means of the connecting tabs 2, the component can be connected to other similar components along their adjacent edges to form the floor and/or wall covering. The connecting tabs 2, 3 are flush with the support surface of the component. FIG. 1 shows the decorative, visible surface 4 facing away from the support surface.

In the plate 1, which can consist of multiple layers, if desired, a passage 5 open to the visible surface and to the support surface is formed, into the sides of which groove-like channels 6, 7 lead; these grooves pass completely across the plate 1 in directions perpendicular to each other and are open to the support surface of the component.

The component shown in FIG. 1 is part of a construction kit, which, in addition to other similar components, also comprises components equipped only with the groove-like channels 6, 7, and thus without a passage 5, as well as components not only without a passage but also without any groove-like channels, such components being in the majority.

Figure 2:
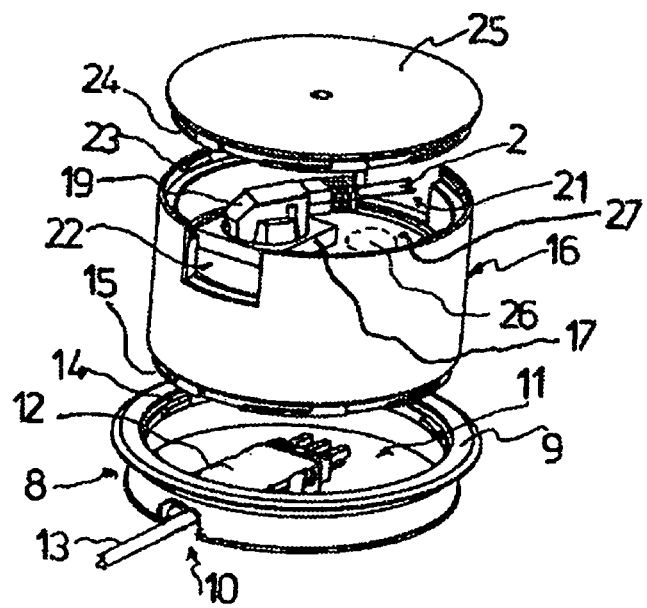
FIG. 2 shows an exploded, perspective view of electrical connecting and junction elements which can be attached to a component.

In FIG. 2 it is possible to see an insert 8, configured to be inserted into the passage 5 and fixed in place there by means of an adhesive, for example; the insert comprises a flange 9, which can be configured in the form of a ring or alternatively as a shell with a bottom, and also an opening 10, which is aligned with one of the entrances of the groove-like channels 6, 7.

The insert 8 forms a junction space 11, which accommodates a blade terminal 12, this terminal being connected to a power cable 13 fed through the channel 6 or 7.

As can also be derived from FIG. 2, the insert 8 comprises inward-projecting lugs 14, which form part of a bayonet joint, by means of which the insert 8 can be connected to a junction element 16, which is provided with corresponding lugs 15.

Figure 3:
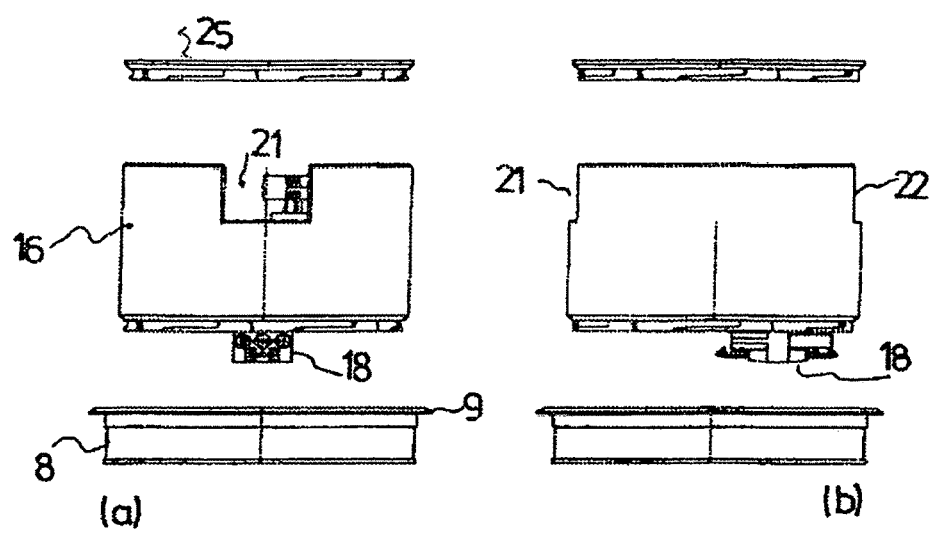
FIG. 3 shows various side views of the connecting and junction elements of FIG. 2.
Figure 4:
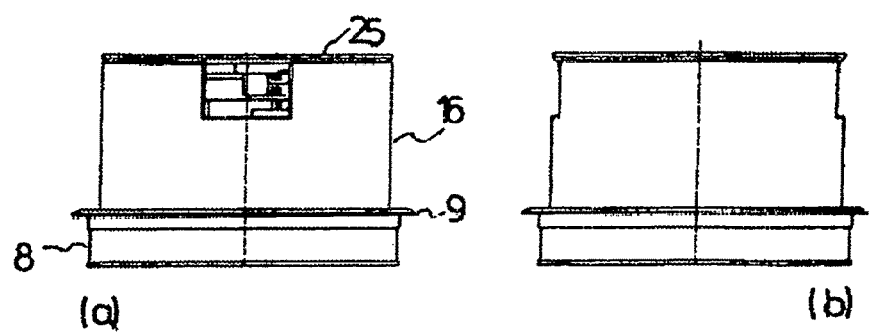
FIG. 4 shows various side views of the junction elements of FIG. 2 in the assembled state.

The junction element 16 comprises a power outlet 17, the contacts of which are connected to a plug connector element 18 visible only in FIG. 3, into which the blade terminal 12 can be inserted. In the example shown here, an angle plug 19 with a plug cable 20 is inserted into the power outlet 17. The plug cable 20 can be guided from the junction element 16 to the outside through an edge recess 21 or alternatively through an edge recess 22 opposite the edge recess 21.

Lugs 23 projecting inward from the upper edge cooperate with lugs 24 of a cover plate 25 to form a bayonet joint, by means of which the cover plate 25 can be fastened to the junction element 16. The cover plate 25 can also serve to cover the insert 8 when the insert is not being used to hold a junction element 16.

The broken line 26 in FIG. 2 indicates a passage through an intermediate plate 27 of the junction element 16 supporting the outlet 17; low-voltage current lines laid through one of the groove-like channels 6, 7 are guided through this passage and can then be guided to the outside through the edge recess 21 or 22.

To produce an electrical junction, first the cover plate 25 is removed from the insert 8 by releasing the bayonet joint formed by the lugs 14 and 24. The blade terminal 12 present in the junction space 11 is then inserted into the plug connector element 18 of the junction element 16. The power cable 13 is able to flex in the groove-like channel 6 or 7, which means that the blade terminal 12 can therefore be moved enough to make the insertion step possible. This flexibility of the power cable also makes it possible, afterwards, to fasten the junction element 16 to the insert 8 by rotating it and thus closing the bayonet joint formed by the lugs 15 and 16. Prior to this, it would have been possible, if circumstances demanded it, to lay low-voltage current lines through the passage formed at 26 in the intermediate plate 27 of the junction element 16. After the angle plug 19 has been plugged in, the cover plate 25 can be fastened to the junction element 16 by means of the bayonet joint formed by the lugs 23, 24.

The invention claimed is:

1. A construction kit for producing coverings, comprising: rectangular panel components laid with their edges joining one another; and means for joining the edges together, wherein the joining means include connecting tabs that project from adjacent edges of the components, wherein the components include components with at least one groove-shaped channel open toward a support side of the component to accommodate electrical lines and a passage communicating with the channel and open toward a visible side of the component, wherein the channel passes completely across the component, including the connecting tabs, parallel to one of the edges and a middle axis extending in a plane of the component, and the passage is a through hole that extends through the entire component and has a diameter larger than a width of the channel, wherein the channel is arranged at a distance from the middle axis and at a distance from the edge, and the passage is arranged in a corner region of the component.

2. The construction kit according to claim 1, further comprising components that comprise only the at least one channel, without the passage communicating with the channel, as well as components without channels or passages.

3. The construction kit according to claim 1, wherein the components include components with two channels.

4. The construction kit according to claim 3, wherein the two channels cross each other at right angles.

5. The construction kit according to claim 1, wherein the at least one channel is formed by a groove open toward a support side of the component or by a tube cast or foamed into the component.

6. The construction kit according to claim 5, wherein the groove extends along an edge of the component.

7. The construction kit according to claim 1, wherein the opening of the passage on the visible side of the component is closed by a cover element.

8. The construction kit according to claim 7, wherein the opening is closed by the cover element so as to be liquid tight.

9. The construction kit according to claim 7, wherein the cover element is configured to be ridden on and walked on.

10. The construction kit according to claim 1, wherein the passage is formed by a recess, into which recess the channel opens laterally.

11. The construction kit according to claim 10, wherein the recess is lined by an insert and open at least toward the visible side of the component.

12. The construction kit according to claim 1, wherein a junction element, connectable to an electrical line laid in the channel and comprising a power outlet, is mounted in the opening of the passage on the visible side of the component.

13. The construction kit according to claim 12, wherein the passage forms a junction space accommodating at least one connecting element for connecting the electrical lines to the junction element.

14. The construction kit according to claim 13, wherein the connecting element is a blade terminal.

15. The construction kit according to claim 13, wherein the connecting element is movable in the junction space.

16. The construction kit according to claim 12, further comprising a closure device that fastens the junction element in the opening by rotation of the junction element.

17. The construction kit according to claim 16, wherein the closure device is a bayonet joint.

18. The construction kit according to claim 12, wherein the junction element is a line current supplying junction element.

19. The construction kit according to claim 12, wherein the junction element comprises a passage forming an extension of the passage, through which low-voltage current lines can be laid.

20. The construction kit according to claim 12, wherein the junction element is configured as a junction box with at least one edge recess at an upper edge to allow lines to be guided outwardly.

* * * * *